(12) United States Patent
Lassoued et al.

(10) Patent No.: US 10,902,336 B2
(45) Date of Patent: Jan. 26, 2021

(54) MONITORING VEHICULAR OPERATION RISK USING SENSING DEVICES

(71) Applicant: INTERNATIONAL BUSINESS MACHINES CORPORATION, Armonk, NY (US)

(72) Inventors: Yassine Lassoued, Carpenterstown (IE); Martin Mevissen, Dublin (IE); Julien Monteil, Dublin (IE); Giovanni Russo, Dublin (IE)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 615 days.

(21) Appl. No.: 15/723,671

(22) Filed: Oct. 3, 2017

(65) Prior Publication Data

US 2019/0102689 A1 Apr. 4, 2019

(51) Int. Cl.

| G06N 5/04 | (2006.01) |
|---|---|
| G07C 5/08 | (2006.01) |
| G06N 20/00 | (2019.01) |
| G07C 5/00 | (2006.01) |
| G06N 7/00 | (2006.01) |
| G06Q 10/00 | (2012.01) |
| G06N 3/08 | (2006.01) |

(Continued)

(52) U.S. Cl.
CPC ............. *G06N 5/048* (2013.01); *G06N 20/00* (2019.01); *G07C 5/008* (2013.01); *G07C 5/085* (2013.01); *G07C 5/0841* (2013.01); *G06N 3/084* (2013.01); *G06N 3/088* (2013.01); *G06N 5/003* (2013.01); *G06N 5/025* (2013.01); *G06N 7/005* (2013.01); *G06N 20/10* (2019.01); *G06Q 10/00* (2013.01)

(58) Field of Classification Search
CPC ........ G06N 5/048; G06N 20/00; G06N 3/088; G06N 5/003; G06N 5/025; G06N 20/10; G06N 3/084; G06N 7/005; G07C 5/0841; G07C 5/008; G07C 5/085; G06Q 10/00
See application file for complete search history.

(56) References Cited

U.S. PATENT DOCUMENTS

| 7,692,552 B2 | 4/2010 | Harrington et al. |
|---|---|---|
| 9,571,449 B2 | 2/2017 | Obradovich |

(Continued)

FOREIGN PATENT DOCUMENTS

| CN | 106794840 A | 5/2015 |
|---|---|---|
| CN | 105073474 A | 11/2015 |

(Continued)

OTHER PUBLICATIONS

Al-Sultan et al., "Context-Aware Driver Behavior Detection System in Intelligent Transportation Systems," IEEE Transactions on Vehicular Technology, vol. 62, No. 9, Nov. 2013 (12 pages).

(Continued)

*Primary Examiner* — Russell Frejd
(74) *Attorney, Agent, or Firm* — Griffiths & Seaton PLLC (57) ABSTRACT

Embodiments for monitoring risk associated with operating a vehicle by a processor. One or more behavior parameters of an operator of a vehicle may be learned in relation to the vehicle, one or more alternative vehicles, or a combination thereof using one or more sensing devices for a journey. A risk associated with the one or more learned behavior parameters for the journey may be assessed.

20 Claims, 7 Drawing Sheets

(51) Int. Cl.
*G06N 20/10* (2019.01)
*G06N 5/02* (2006.01)
*G06N 5/00* (2006.01)

(56) References Cited

U.S. PATENT DOCUMENTS

| | | | |
|---|---|---|---|
| 9,714,037 B2 | 7/2017 | Deruyek et al. | |
| 2005/0116829 A1* | 6/2005 | Koenig | B60R 16/0231 |
| | | | 340/576 |
| 2008/0243558 A1* | 10/2008 | Gupte | G06Q 40/08 |
| | | | 705/4 |
| 2008/0255888 A1* | 10/2008 | Berkobin | G06Q 40/08 |
| | | | 705/4 |
| 2012/0245758 A1* | 9/2012 | Mizuta | B60W 30/182 |
| | | | 701/1 |
| 2014/0236414 A1* | 8/2014 | Droz | G08G 1/166 |
| | | | 701/28 |
| 2014/0278586 A1* | 9/2014 | Sanchez | G06Q 40/00 |
| | | | 705/4 |
| 2015/0170436 A1 | 6/2015 | Stacy | |
| 2015/0213656 A1 | 7/2015 | Stacy | |
| 2015/0363984 A1* | 12/2015 | Garcia Manchado | G01S 19/13 |
| | | | 701/32.4 |
| 2017/0053461 A1* | 2/2017 | Pal | G06N 7/005 |
| 2017/0076395 A1* | 3/2017 | Sedlik | A61B 5/02055 |
| 2017/0148350 A1 | 5/2017 | Stankoulov | |
| 2017/0186321 A1 | 6/2017 | Dai | |
| 2017/0263061 A1* | 9/2017 | Mann | G07C 5/0808 |
| 2017/0309092 A1* | 10/2017 | Rosenbaum | G01M 17/007 |
| 2018/0339653 A1* | 11/2018 | Adams | G07C 5/0841 |
| 2018/0362031 A1* | 12/2018 | Chang | B60W 30/18163 |
| 2019/0087911 A1* | 3/2019 | Adams | G06Q 30/0283 |
| 2019/0100216 A1* | 4/2019 | Volos | G01S 19/42 |

FOREIGN PATENT DOCUMENTS

| | | |
|---|---|---|
| CN | 106781581 A | 5/2017 |
| EP | 2778007 A1 | 9/2014 |
| EP | 2863282 B1 | 3/2017 |
| WO | 2014016620 A9 | 7/2014 |

OTHER PUBLICATIONS

Sharma et al., "Driver behavior detection and vehicle rating using multi-UAV coordinated vehicular networks," Journal of Computer and System Sciences, vol. 86, 2017 (30 pages).

Niall O'Hara et al., "Towards Evaluating the Benefits of Inter-vehicle Coordination" IEEE 18th International conference on Intelligent Transportation Systems. 2015 (7 pages).

* cited by examiner

MONITORING VEHICULAR OPERATION RISK USING SENSING DEVICES

BACKGROUND OF THE INVENTION

Field of the Invention

The present invention relates in general to computing systems, and more particularly to, various embodiments for monitoring risk associated with operating a vehicle in relation to a journey using sensing information gathered from sensing devices by a processor.

Description of the Related Art

Vehicles of every kind, size, and energy consumption are prevalent in every aspect of today's society, as people are more mobile today than likely at any time in recorded history. For example, millions of cars, trucks, trains, and other land vehicles run on the U.S. roadways at any moment. Attendant with the proliferation of vehicles have been increased driving risks associated with a variety of environmental hazards. It is a constant necessity to improve the safety on roads and to prevent accidents. As one of ordinary skill in the art will appreciate, conventional aids enabling a driver to reduce the operational risk are limited in some cases, for example, to only externally-mounted side view mirrors and an internally-mounted rear view mirror. The challenges of preventing and reducing risks include a driver not being aware of their driving habits and driving habits of others along with various other environmental conditions.

SUMMARY OF THE INVENTION

Various embodiments for monitoring risk associated with operating a vehicle in relation to a journey using sensing information gathered from sensing devices by a processor, are provided. In one embodiment, by way of example only, a method for real-time monitoring risk associated with operating a vehicle by a processor is provided. One or more behavior parameters of an operator of a vehicle may be learned in relation to the vehicle, one or more alternative vehicles, or a combination thereof using one or more sensing devices for a journey. A risk associated with the one or more learned behavior parameters for the journey may be assessed.

BRIEF DESCRIPTION OF THE DRAWINGS

In order that the advantages of the invention will be readily understood, a more particular description of the invention briefly described above will be rendered by reference to specific embodiments that are illustrated in the appended drawings. Understanding that these drawings depict only typical embodiments of the invention and are not therefore to be considered to be limiting of its scope, the invention will be described and explained with additional specificity and detail through the use of the accompanying drawings, in which.

DETAILED DESCRIPTION OF THE DRAWINGS

It is a constant necessity to improve the safety on roads and to prevent accidents. As aforementioned, attendant with the proliferation of vehicles have been increased driving risks associated with a variety of environmental hazards. Advancements in vehicle operation safety have progressed over the years, with new safety features and enhancements introduced with successive generations of vehicles. Safety features have evolved either by government mandate or market driven demand.

However, common problems of the operators of motor vehicles is the difficulty in detecting risks that may be associated with the driver, other vehicles, and environmental hazards or conditions. Risks associated with vehicle operations may include, for example, aggressive driving patterns, stress of a driver, driver fatigue, time of day, road conditions, weather, and even failure of a driver to pay enough attention to the surrounding environment (e.g., a driver texting while driving or failing to check a blind spot when changing lanes). Depending on the destination of the driver, these risks may be specific to the context of the journey (e.g., urban road/motorway, weather, traffic density, traffic rules, etc.).

Prior solutions and safety features designed to improve road safety and prevent accidents have included, for example, radial tires, padded dashboards, safety glass, and passive restraints (seat belts). However, a need exists for the ability to monitor driving behavior both in the short term (e.g., during a period of operating the vehicle) and also in the long run (e.g., reducing risk from learned behavior to reduce insurance pricing schemes).

Thus, various embodiments are provided herein for monitoring risk associated with operating a vehicle in relation to a journey using relative sensing. One or more behavior parameters of an operator of a vehicle may be learned in relation to the vehicle, one or more alternative vehicles, or a combination thereof using one or more sensing devices for a journey. A risk associated with the one or more learned behavior parameters for the journey may be assessed. In one aspect, a vehicle may be an automobile, bicycle, motorcycle, boat, ship, aircraft, off road vehicle, truck, and the like. The monitoring risk associated with operating a vehicle in relation to a journey may be the use of real-time sensing of acceleration and speed of the vehicle, as well as real-time sensing of relative distances and speeds of vehicles that may completely and/or partially surround the vehicle. The sensors may be used to infer in real-time the contexts of the journey.

In one aspect, the present invention considers the driver, the vehicle, and the environment to characterize and define the driver's behavior (e.g., reaction time, time headway, aggressiveness, politeness, etc.) by making use of a multitude of internal and external data sources. As opposed to existing approaches used, the proposed solution utilizes physical behavioral models that reflect driving risk and increases vehicle operation safety.

In one aspect, the mechanisms of the present invention learn a series of driver behavioral parameters based on: (1) detecting sensor data from one or more sensors relating to vehicle dynamics and relative vehicle dynamics; (2) receiving vehicular collaboration data received from other vehicles via "vehicle-to-vehicle" ('V2V') communication and/or considering other car-external data sources (e.g. drones, moving cameras); (3) learning driver physical behavioral model parameters and indicators (e.g., lane changing, car-following, safety or other types of indicators); (4) monitoring or identifying risk/safety of the driving behavior based on the learned driver behavioral parameters; (5) suggesting appropriate risk-mitigation measures, such as risk mitigation recommendations (real-time) and updating an insurance pricing scheme (non real-time); and/or (6) estimating, in real-time, driver behavioral parameters characterizing the safety, comfort, and efficiency of the driver based on relative (lateral and longitudinal) sensing information and, if available, Internet of Things ("IoT") data.

In one aspect, in-vehicle data (e.g., on-board sensor data) may be obtained from one or more proximity sensors (e.g., relative sensors) along with other data such as, for example, location data, diagnostic data, speed, etc. Critical driver specific parameters or "contextual factors" (e.g., driver reaction time, driver time headway, driver aggressiveness, standard deviation of a driver time to collision distribution, etc.) may be dynamically learned via one or more machine learning operations such as, for example, Kalman filters, particle filtering techniques, and MCMC (Monte Carlo Markov Chain) techniques. Furthermore, contextual factors may be in a specific context related to a journey. The contextual factors may also include, for example, traffic data, weather data, road conditions, a health state of the operator, biometric data of the operator, position data of one or more alternative vehicles in relation to the vehicle, or a combination thereof. Any deviation of these contextual factors/parameter values to standardized or previously learned parameters of the driver (or other drivers) in the associated context may be used as input to a risk model (e.g., using value at risk theory, extreme value theory, etc.). The deviation to a known standard distribution or base-standard of drivers may be used. Thus, the learned behavioral parameters of the driver may be used to advise, mitigate, and price applications. Thus, the present invention further enables monitoring and characterizing the driver behavior in various automotive applications, such as driving risk detection and mitigation systems, motor insurance applications, and the like.

The vehicular collaboration data may be retrieved from a vehicular collaboration system capturing one or more angles, views, longitudinal positions, latitudinal positions, sensor data, and/or other dimensions of the vehicle for other vehicles by using, for example, one or more cameras and/or sensor based devices of nearby, neighboring cars. The vehicular collaboration system may include using collaborative images, video, sounds, or other sensor-based device data through sharing of information. The collaborative data may be combined to form a 360-degree view of the vehicle capable of being displayed such as, for example, in a display system of the vehicle.

The so-called "journey" may be very subjective and context dependent. A journey may simply be, in a broadest possible meaning, the entire/whole travel experience from a point A to a point B. For example, a journey may encompass an entire travel experience. In a more limiting context, a journey may include one or more actions or movements of traveling from one location to another location. The journey may also include one or more acts, events, decisions, or travel related operations relating to one or more acts of moving from one location to one or more alternative locations. A journey may include each decision, experience, action, and/or movement within and without a vehicle. A journey may include one or more routes and destinations. A journey may also include one or more actions, movements, stops (temporary or permanent), travel information, reservations, transportation options, modes of travel, and/or one or more operations relating to navigation systems, entertainment systems, and/or telecommunication systems. In one aspect, a journey may be a user defined location-to-location (point-to-point) journey and/or the use of single or multi-modal travel means. Also, the journey may be location-to-location (point-to-point) journey details or single or multi-modal travel planning learned via cognitive reasoning and/or artificial intelligence.

Additional aspects of the present invention and attendant benefits will be further described, following.

It is understood in advance that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Figure 1:
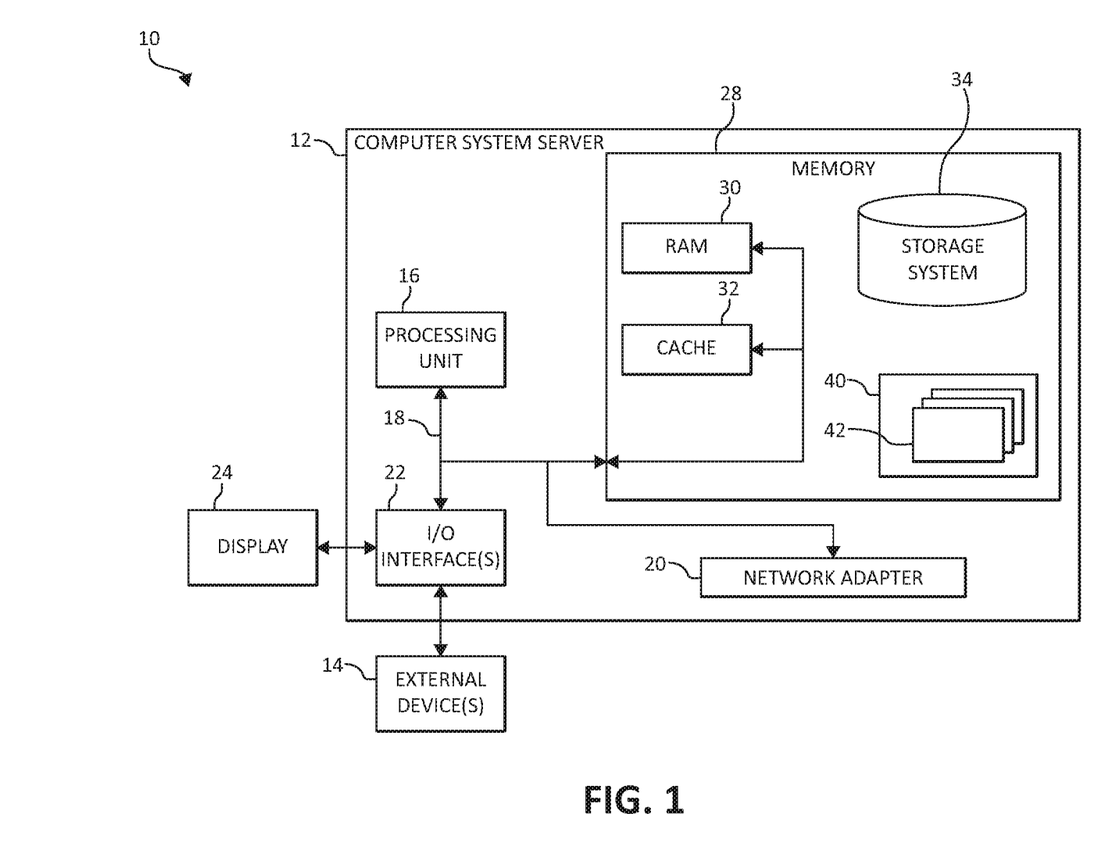
FIG. 1 is a block diagram depicting an exemplary computing node according to an embodiment of the present invention.

Referring now to FIG. 1, a schematic of an example of a cloud computing node is shown. Cloud computing node 10 is only one example of a suitable cloud computing node and is not intended to suggest any limitation as to the scope of use or functionality of embodiments of the invention described herein. Regardless, cloud computing node 10 is capable of being implemented and/or performing any of the functionality set forth hereinabove.

In cloud computing node 10 there is a computer system/server 12, which is operational with numerous other general purpose or special purpose computing system environments or configurations. Examples of well-known computing systems, environments, and/or configurations that may be suitable for use with computer system/server 12 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 12 may be described in the general context of computer system-executable instructions, such as program modules, being executed by a computer system. Generally, program modules may include routines, programs, objects, components, logic, data structures, and so on that perform particular tasks or implement particular abstract data types. Computer system/server 12 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 1, computer system/server 12 in cloud computing node 10 is shown in the form of a general-purpose computing device. The components of computer system/server 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random access memory (RAM) 30 and/or cache memory 32. Computer system/server 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, system memory 28 may include at least one program product having a set (e.g., at least one) of program modules that are configured to carry out the functions of embodiments of the invention.

Program/utility 40, having a set (at least one) of program modules 42, may be stored in system memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the invention as described herein.

Computer system/server 12 may also communicate with one or more external devices 14 such as a keyboard, a pointing device, a display 24, etc.; one or more devices that enable a user to interact with computer system/server 12; and/or any devices (e.g., network card, modem, etc.) that enable computer system/server 12 to communicate with one or more other computing devices. Such communication can occur via Input/Output (I/O) interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples, include, but are not limited to: microcode, device drivers, redundant processing units, external disk drive arrays, RAID systems, tape drives, and data archival storage systems, etc.

In the context of the present invention, and as one of skill in the art will appreciate, various components depicted in FIG. 1 may be located in a moving vehicle. For example, some of the processing and data storage capabilities associated with mechanisms of the illustrated embodiments may take place locally via local processing components, while the same components are connected via a network to remotely located, distributed computing data processing and storage components to accomplish various purposes of the present invention. Again, as will be appreciated by one of ordinary skill in the art, the present illustration is intended to convey only a subset of what may be an entire connected network of distributed computing components that accomplish various inventive aspects collectively.

Figure 2:
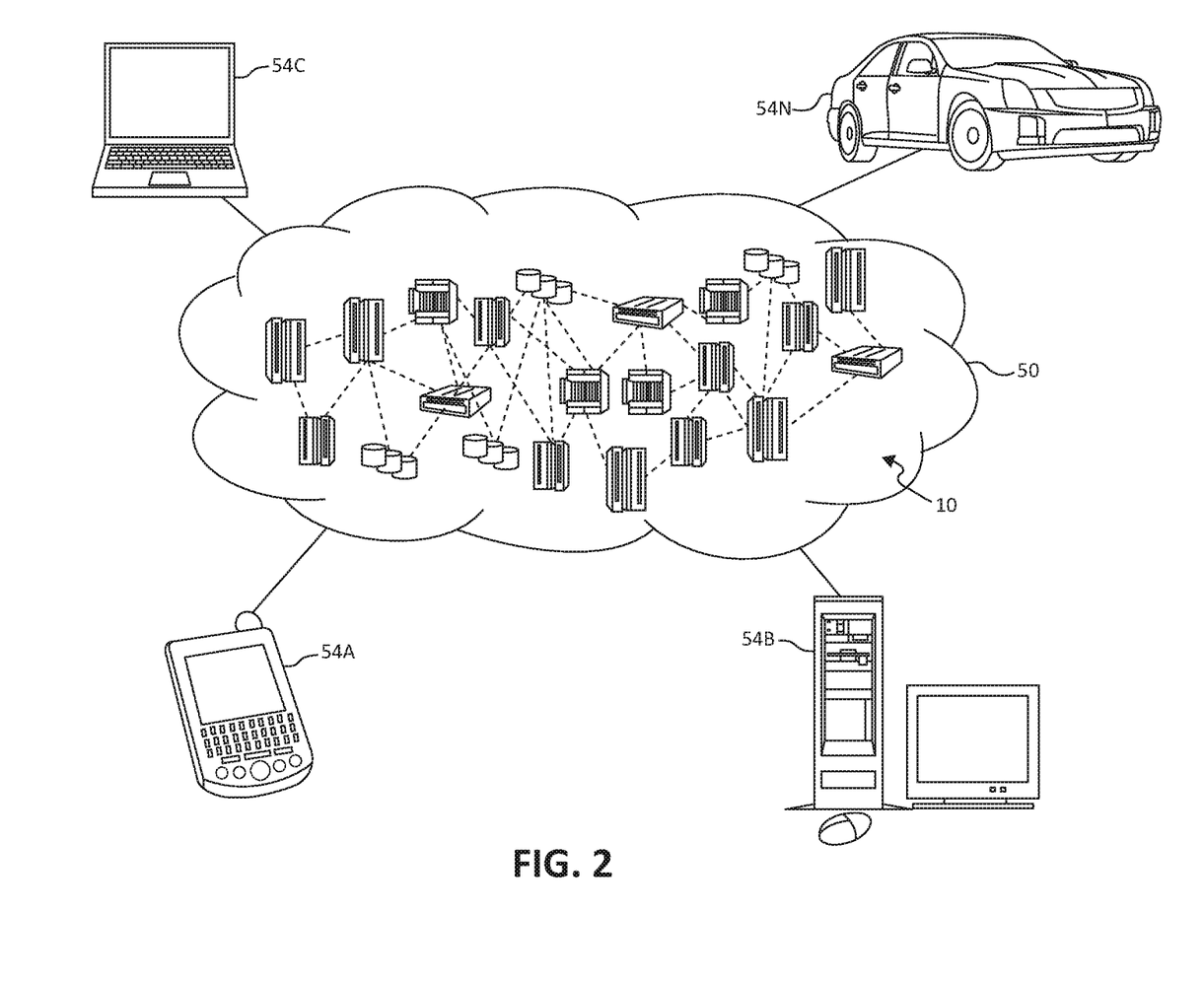
FIG. 2 is an additional block diagram depicting an exemplary cloud computing environment according to an embodiment of the present invention.

Referring now to FIG. 2, illustrative cloud computing environment 50 is depicted. As shown, cloud computing environment 50 comprises one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 2 are intended to be illustrative only and that computing nodes 10 and cloud computing environment 50 can communicate with any type of computerized device over any type of network and/or network addressable connection (e.g., using a web browser).

Figure 3:
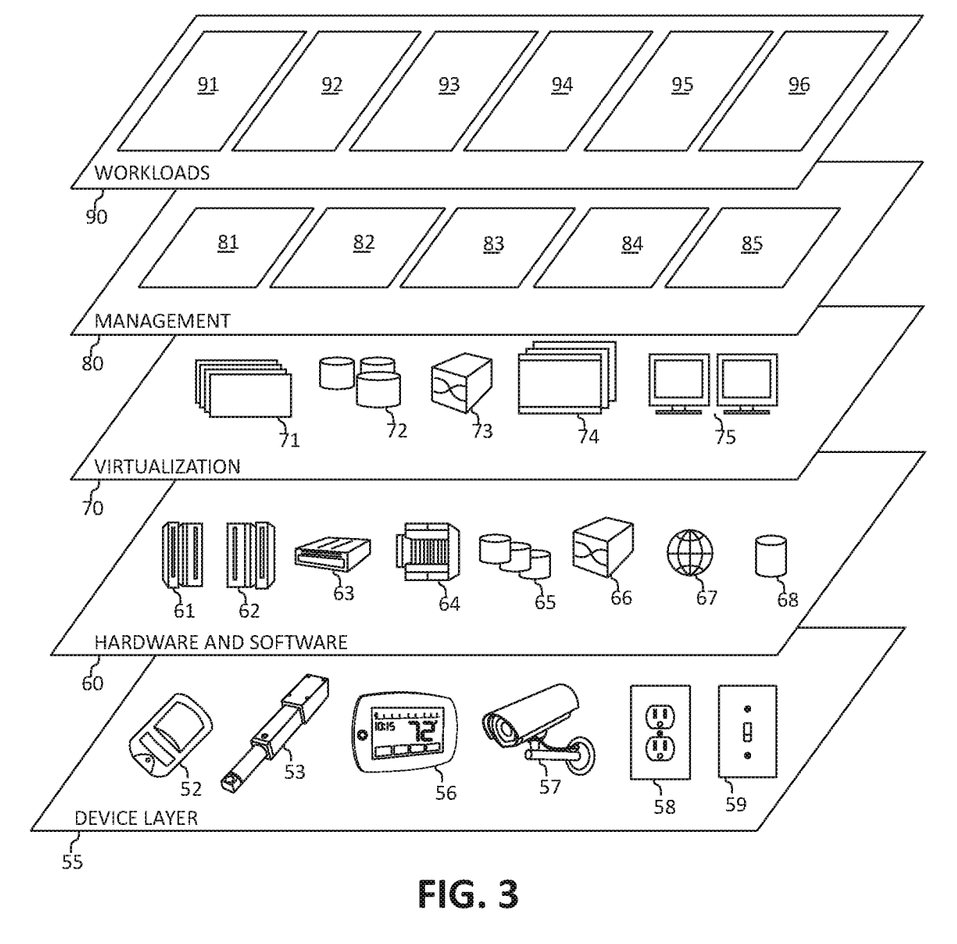
FIG. 3 is an additional block diagram depicting abstraction model layers according to an embodiment of the present invention.

Referring now to FIG. 3, a set of functional abstraction layers provided by cloud computing environment 50 (FIG. 2) is shown. It should be understood in advance that the components, layers, and functions shown in FIG. 3 are intended to be illustrative only and embodiments of the invention are not limited thereto. As depicted, the following layers and corresponding functions are provided:

Device layer 55 includes physical and/or virtual devices, embedded with and/or standalone electronics, sensors, actuators, and other objects to perform various tasks in a cloud computing environment 50. Each of the devices in the device layer 55 incorporates networking capability to other functional abstraction layers such that information obtained from the devices may be provided thereto, and/or information from the other abstraction layers may be provided to the devices. In one embodiment, the various devices inclusive of the device layer 55 may incorporate a network of entities collectively known as the "internet of things" (IoT). Such a network of entities allows for intercommunication, collection, and dissemination of data to accomplish a great variety of purposes, as one of ordinary skill in the art will appreciate.

Device layer 55 as shown includes sensor 52, actuator 53, "learning" thermostat 56 with integrated processing, sensor, and networking electronics, camera 57, controllable household outlet/receptacle 58, and controllable electrical switch 59 as shown. Other possible devices may include, but are not limited to various additional sensor devices, networking devices, electronics devices (such as a remote control device), additional actuator devices, so called "smart" appliances such as a refrigerator or washer/dryer, and a wide variety of other possible interconnected objects.

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provides cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provides pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and, in the context of the illustrated embodiments of the present invention, various vehicular operation risk assessment workloads and functions 96. In addition, vehicular operation risk assessment workloads and functions 96 may include such operations as data analysis (including data collection and processing from various vehicular or environmental sensors), collaborative data analysis, and predictive data analytics functions. One of ordinary skill in the art will appreciate that the vehicular operation risk assessment workloads and functions 96 may also work in conjunction with other portions of the various abstractions layers, such as those in hardware and software 60, virtualization 70, management 80, and other workloads 90 (such as data analytics processing 94, for example) to accomplish the various purposes of the illustrated embodiments of the present invention.

As previously mentioned, the mechanisms of the illustrated embodiments provide novel approaches for monitoring risk associated with operating a vehicle in relation to a journey using relative sensing. Behavioral parameters may be learned and compared with previously learned behavioral parameters. A warning/mitigation action may be proposed to the driver based on physical models of lateral and longitudinal driving behaviors and behavioral parameters such as, for example, driver response reaction time, maximum acceleration, deceleration parameters, induced deceleration parameters, lane change aggressiveness, etc.

In-vehicle relative sensors (e.g., radars, LIDARs, cameras) as well as positioning sensors (e.g., accelerometer, global positioning satellite "GPS", and/or on-board diagnostic "OBD" or OBD-II system) may be employed and used to learn the longitudinal and lateral behavioral parameters of a driver specific to the context of the drive (e.g. road type, weather, traffic density, illumination). Learned parameters characterizing the driving behavior of the driver, in the context of a journey, enables the identification and learning of the driver, a driving style or pattern, a health state status of the driver (e.g., fatigue, stress, excitement, etc.), unsafe driving, pollution prone driving style, and the like. Upon detection of critical or risk-detected driving situations, a series of mitigation measures or alerts may be provided. For example, a warning may be issued, an automated vehicle-operation system may be initiated to perform the driving task, an insurance malus (or bonus in case of safe driving) may be issued, and/or a re-routing of the journey to a more suitable (e.g., less stress-prone) road may be suggested to minimize or reduce the detected risk.

In one aspect, the mechanisms of the illustrated embodiments provide for a warning recommendation system that may receive information on the context of a journey. The mechanisms of the illustrated embodiments learn the behavioral parameters of a physical lateral and longitudinal motion model in an online manner. The obtained learned parameters may be compared with previously learned parameters that may be stored in a device driver database (e.g., a cloud computing system as indicated above). If a vehicle operation behavior deviation is observed, the deviation observed may be mapped to an underlying driver condition (e.g., fatigue, stress, etc.). A calibrated risk model may be used to link parameter values to the conditions of the driver. The mechanisms of the illustrated embodiments warn the driver that the driving behavior is unsafe, dangerous, aggressive, or provide another explanation as to the assessed risk and may recommend a different course of vehicle operational behavior (e.g., a lane change assist, optimal speed, autopilot system, etc.).

In one aspect, the mechanisms of the illustrated embodiments provide a pricing scheme system. For example, an operator of a vehicle may operate the vehicle in a particular context (particular road type, weather condition, etc.). The system learns the behavioral parameters of the physical lateral and longitudinal motion models in an online manner. The obtained learned parameters may be compared with a distribution of the behavioral parameters stored in the database. If a high vehicle operation behavior deviation (e.g., such as deviation within a defined range, above or below a threshold, or even a selected value) is observed in the sense of risk modelling (e.g. value at risk, extreme value theory), the system may warn the driver that a malus (e.g., bonus) may be issued to an insurance plan associated with the driver. In the context of an accident, such data about the values of the behavioral parameters/proximity sensors may help correct any disputes or claims.

Figure 4:
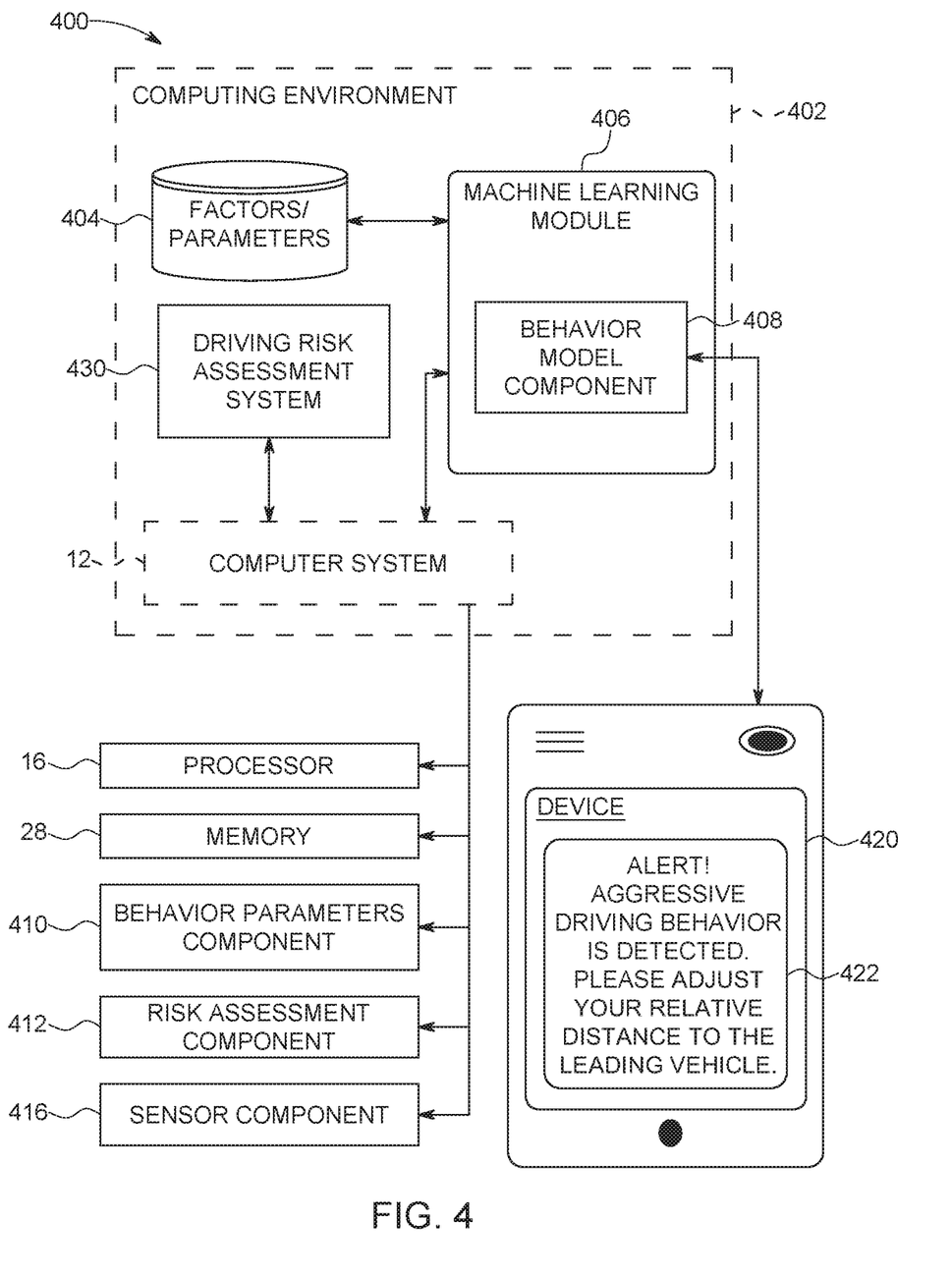
FIG. 4 is a diagram depicting various user hardware and computing components functioning in accordance with aspects of the present invention.

Turning now to FIG. 4, a block diagram depicting exemplary functional components 400 according to various mechanisms of the illustrated embodiments is shown. FIG. 4 illustrates monitoring and assessing risk associated with operating a vehicle in relation to a journey using relative sensing in a computing environment, such as a computing environment 402, according to an example of the present technology. As will be seen, many of the functional blocks may also be considered "modules" or "components" of functionality, in the same descriptive sense as has been previously described in FIGS. 1-3. With the foregoing in mind, the module/component blocks 400 may also be incorporated into various hardware and software components of a system for accurate temporal event predictive modeling in accordance with the present invention. Many of the functional blocks 400 may execute as background processes on various components, either in distributed computing components, or on the user device, or elsewhere. Computer system/server 12 is again shown, incorporating processing unit 16 and memory 28 to perform various computational, data processing and other functionality in accordance with various aspects of the present invention.

The system 400 may include the computing environment 402, a driving risk assessment system 430, and a device 420, such as a desktop computer, laptop computer, tablet, smart phone, vehicular communication system, or on-board navigation system, and/or another electronic device that may have one or more processors and memory. The device 420, the driving risk assessment system 430, and the computing environment 402 may each be associated with and/or in communication with each other by one or more communication methods, such as a computing network. In one example, the device 420 and/or the driving risk assessment system 430 may be controlled by an owner, customer, or technician/administrator associated with the computing environment 402. In another example, the device 420 and/or the driving risk assessment system 430 may be completely independent from the owner, customer, or technician/administrator of the computing environment 402.

In one aspect, the computing environment 402 may provide virtualized computing services (i.e., virtualized computing, virtualized storage, virtualized networking, etc.) to devices 420. More specifically, the computing environment 402 may provide virtualized computing, virtualized storage, virtualized networking and other virtualized services that are executing on a hardware substrate.

As depicted in FIG. 4, the computing environment 402 may include a machine learning module 406, a factors and/or parameters 404 that is associated with a machine learning module 406, and the driving risk assessment system 430. The factors and/or parameters database 404 may also include vehicle operator profiles for each operator of a vehicle associated with the driving risk assessment system 430 and/or sensor devices associated with a sensor component 416. It should be noted that one or more IoT sensor devices, or positioning sensor devices, may be represented as the sensor component 416 and may be coupled to the driving risk assessment system 430. The factors and/or parameters 404 may be a combination of factors, parameters, behavior characteristics, learned behavior parameter data, vehicle operation standards/values, temperature data, historical data, traffic data, weather data, road conditions, a health state of the operator, biometric data of the operator, longitudinal position data, latitudinal position data, longitudinal/latitudinal position data of one or more alternative vehicles in relation to the vehicle, or a combination thereof relating to the driving risk assessment system 430. That is, different combinations of parameters may be selected and applied to the input data for learning or training one or more machine learning models such as, for example, using a behavior model component of the machine learning module 406. The factors and/or parameters 404 may define one or more settings of one or more sensors associated with the sensor component 416 to enable the one or more IoT sensors to detect data via the sensor component 416. The one or more sensors associated with the sensor component 416 may be coupled to the driving risk assessment system 430.

The computing environment 402 may also include a computer system 12, as depicted in FIG. 1. The computer system 12 may also include the behavior parameters component 410, a risk assessment component 412, and a sensor component 416 each associated with the machine learning module for training and learning one or more machine learning models and also for applying multiple combinations of factors, parameters, behavior characteristics, vehicle operator profiles, vehicle operation or behavior standards/values, learned behavior parameter data, temperature data, historical data, traffic data, weather data, road conditions, a health state of the operator, biometric data of the operator, longitudinal position data, latitudinal position data, longitudinal/latitudinal position data of one or more alternative vehicles in relation to the vehicle, or a combination thereof to the machine learning model for monitoring risk associated with operating a vehicle in relation to a journey using relative sensing.

In one aspect, the machine learning module 406 may include a behavior model component 408 for cognitively predicting and/or cognitively estimating a risk associated with learned behavior parameters learned from one or more sensors associated with the sensor component 416 in the driving risk assessment system 430. In one aspect, the machine learning module 406 may assume that the behavior parameters are static given a particular context. Learning the behavioral patterns may include using online static parameter identification (e.g., online parameter estimation in general state-space models).

For example, the computer system 12, using the behavior parameters component 410 and the risk assessment component 412, may cognitively determine or assess the risk associated with a journey by one or more sensors associated with the sensor component 416. That is, the critical driver specific parameters or "contextual factors" (e.g., driver reaction time, driver time headway, driver aggressiveness, standard deviation of a driver time to collision distribution, driver behavior depicted based on weather conditions, time of day, road conditions, behavior of other drivers in relation to the driver, and the like) may be dynamically learned via one or more machine learning operations. For example, the machine learning model may learn that during heavy traffic conditions in the late afternoon (e.g., "rush hour traffic" around 5:00 p.m.), a vehicle operator displays increased biometric activity (e.g., increased heart rate) and aggressive driving behavior (e.g., "road rage") by failing to signal, abrupt lane changes, or other unsafe driving patterns. Accordingly, a vehicle operator profile of the driving risk assessment system 430 may be created, defined, stored, and maintained in the machine learning module 406, the factors and/or parameters 404, or both.

The machine learning module 406 may collect feedback information from the one or more sensors associated with the sensor component 416 to learn the behavior for the driving risk assessment system 430 so as to detect (in association with the behavior parameters component 410) a vehicle operator risk in the context of a journey using relative sensing. The machine learning module 406 may use the feedback information to provide a cognitive risk estimate or assessment for the driving risk assessment system 430 using the behavior model component 408. That is, the behavior model component 408 may cognitively assess the vehicular operator risk for the driving risk assessment system 430 by one or more sensors associated with the sensor component 416 and behavior models. In short, the machine learning module 406 may be initialized using feedback information to learn behavior of a driving risk assessment system 430.

The risk assessment component 412 may monitor driving behavior of the operator using the one or more learned behavior parameters. The risk assessment component 412 may also detect an anomaly in driving behavior of the operator based on a comparison between the one or more learned behavior parameters and previously learned behavior parameters. The risk assessment component 412 may determine and assess a risk associated with the one or more learned behavior parameters learned for an operator of a vehicle in relation to a journey and given a particular context using one or more sensing devices. The context may be learned making use of sensor component 416 and feed information to risk assessment component 412. Thus, upon determining and assessing the risk, the risk assessment component 412 may provide one or more mitigating actions or alerts to reduce the risk, wherein the one or more sensing devices include one or more positioning sensors, one or more Internet of Things (IoT) devices, or a combination thereof. In one aspect, the sensor devices associated with the sensor component 416 may include one or more IoT devices associated with an IoT computing environment or network.

The risk assessment component 412 may base the risk assessment on a comparison of the learned behavioral parameters to the driver's individual and/or collective distributions of behavioral parameters. Each distribution may be associated to a particular context. These distributions may be populated by the risk assessment component 412. For instance, in value at risk theory, the estimated or learned value may be compared against the probability density function to measure the criticality of the deviation to the mean value.

The device 420 may include a graphical user interface (GUI) 422 enabled to display on the device 420 one or more user interface controls for a user to interact with the GUI 422. For example, the GUI 422 may display a risk associated with the one or more learned behavior parameters via an interactive graphical user interface (GUI) according to the learned behavior parameters. For example, the risk assessment component 412 may issue to the device 420 a course of action, an alert, or warning to mitigate the detected risk. The alert may indicate or display audibly and/or visually on the GUI 422 "Alert! Aggressive driving behavior is detected. Please adjust your relative distance to the leading vehicle" (e.g., "Please adjust your relative distance to the vehicle in front of you").

In one aspect, the machine learning modeling, as described herein, may be performed using a wide variety of methods or combinations of methods, such as supervised learning (e.g., MCMC filters, Kalman filters, particle filters, etc.), unsupervised learning, temporal difference learning, reinforcement learning and so forth. That is, the machine learning modeling may learn parameters of one or more physical models. The machine learning modeling may be employed in the category of parameter estimation of state space models, which may be completed by unsupervised learning techniques, particularly to learn the context and/or the indicators.

Some non-limiting examples of supervised learning which may be used with the present technology include Kalman filters, particle filters, MCM filters, AODE (averaged one-dependence estimators), artificial neural network, backpropagation, Bayesian statistics, naive bays classifier, Bayesian network, Bayesian knowledge base, case-based reasoning, decision trees, inductive logic programming, Gaussian process regression, gene expression programming, group method of data handling (GMDH), learning automata, learning vector quantization, minimum message length (decision trees, decision graphs, etc.), lazy learning, instance-based learning, nearest neighbor algorithm, analogical modeling, probably approximately correct (PAC) learning, ripple down rules, a knowledge acquisition methodology, symbolic machine learning algorithms, sub symbolic machine learning algorithms, support vector machines, random forests, ensembles of classifiers, bootstrap aggregating (bagging), boosting (meta-algorithm), ordinal classification, regression analysis, information fuzzy networks (IFN), statistical classification, linear classifiers, fisher's linear discriminant, logistic regression, perceptron, support vector machines, quadratic classifiers, k-nearest neighbor, hidden Markov models and boosting. Some non-limiting examples of unsupervised learning which may be used with the present technology include artificial neural network, data clustering, expectation-maximization, self-organizing map, radial basis function network, vector quantization, generative topographic map, information bottleneck method, IBSEAD (distributed autonomous entity systems based interaction), association rule learning, apriori algorithm, eclat algorithm, FP-growth algorithm, hierarchical clustering, single-linkage clustering, conceptual clustering, partitional clustering, k-means algorithm, fuzzy clustering, and reinforcement learning. Some non-limiting example of temporal difference learning may include Q-learning and learning automata. Specific details regarding any of the examples of supervised, unsupervised, temporal difference or other machine learning described in this paragraph are known and are within the scope of this disclosure. Also, when deploying one or more machine learning models, a computing device may be first tested in a controlled environment before being deployed in a public setting. Also, even when deployed in a public environment (e.g., external to the controlled, testing environment), the computing devices may be monitored for compliance.

Additionally, the computing system 12/computing environment 402 may perform one or more calculations according to mathematical operations or functions that may involve one or more mathematical operations (e.g., solving differential equations or partial differential equations analytically or computationally, using addition, subtraction, division, multiplication, standard deviations, means, averages, percentages, statistical modeling using statistical distributions, by finding minimums, maximums or similar thresholds for combined variables, etc.).

Figure 5:
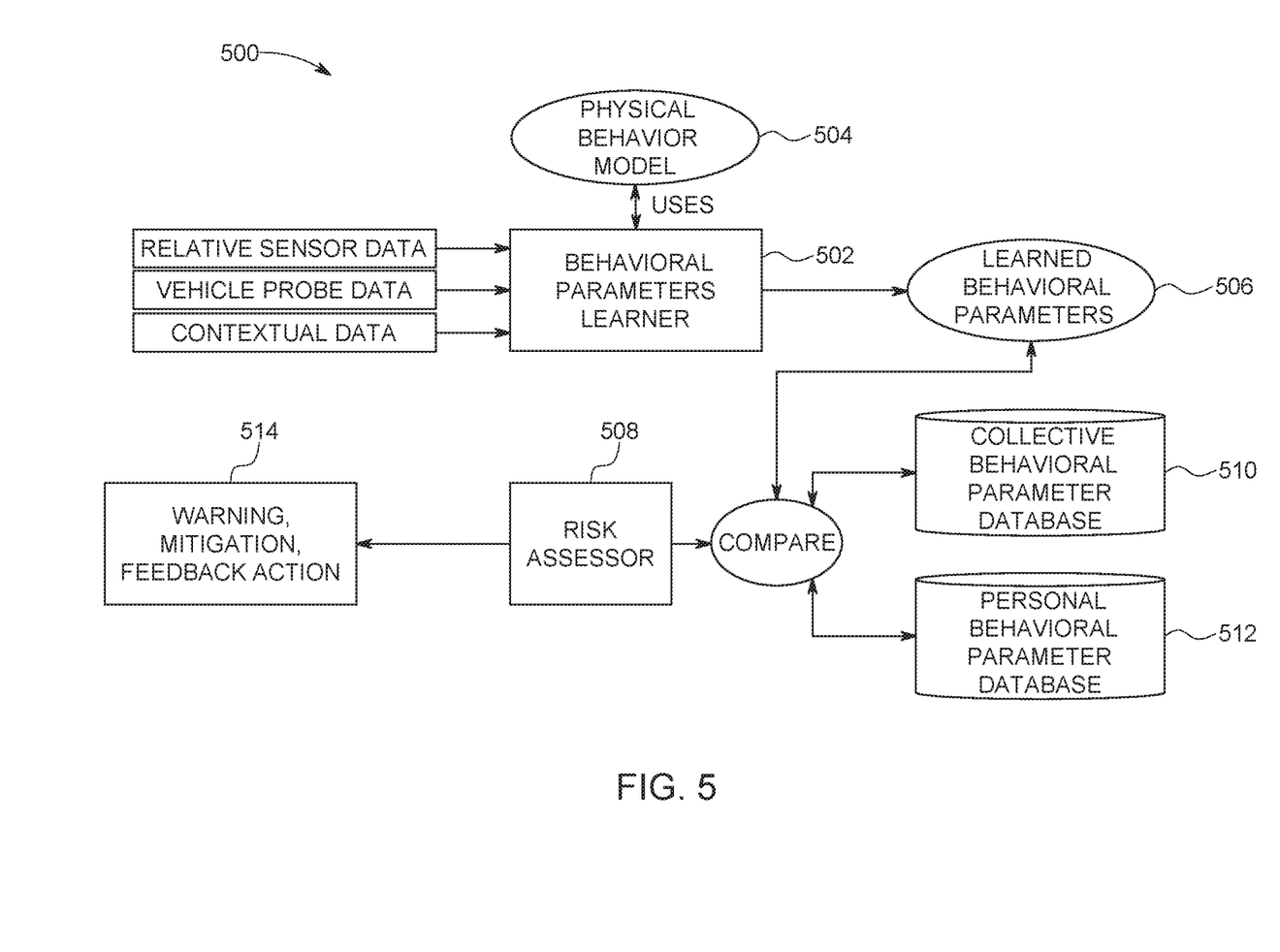
FIG. 5 is a block flow diagram of cognitive vehicle operator risk assessment associated with operating a vehicle in an Internet of Things (IoT) computing network in accordance with aspects of the present invention.

Turning to FIG. 5, a block diagram of various hardware 500 equipped with various functionality as will be further described is shown in which aspects of the mechanisms of the illustrated embodiments may be realized. In one aspect, one or more of the components, modules, services, applications, and/or functions described in FIGS. 1-4 may be used in FIG. 5. For example, computer system/server 12 of FIG. 1 may be included in FIG. 5 and may be connected to other computing nodes (such as computer systems of vehicles or non-vehicle systems such as traffic cameras, cloud computing networks, GPS devices, smart phones, etc.) over a distributed computing network, where additional data collection, processing, analytics, and other functionality may be realized. The computer system/server 12 of FIG. 1, may include hardware 500 (which may be a cognitive vehicle operator risk assessment system, along with other related components in order to analyze and detect a risk associated with a journey identified in/by images, videos, sensor data, or a combination thereof collected from the cameras or from the one or more sensors.

As shown, the various blocks of functionality are depicted with arrows designating the blocks' 500 relationships with each other and to show process flow. Additionally, descriptive information is also seen relating each of the functional blocks 500. As will be seen, many of the functional blocks may also be considered "modules" of functionality, in the same descriptive sense as has been previously described in FIGS. 1-4. With the foregoing in mind, the module blocks 500 may also be incorporated into various hardware and software components of a system for cognitive vehicle operator risk assessment associated with operating a vehicle in relation to a journey in accordance with the present invention. Many of the functional blocks 500 may execute as background processes on various components, either in distributed computing components, or on the user device, or elsewhere, and generally unaware to the user performing generalized tasks.

Starting with block 502, one or more learned behavior parameters may be learned by a behavior parameters learner using a physical behavior model 504. One or more physical behavior models 504 may be used to characterize the longitudinal behavior and lateral behavior of a driver based on the vehicle speed, relative positioning, and relative speeds to surrounding vehicles. In one aspect, a physical behavior model may be determined according to equation 1:

$$\ddot{x}_n = f_{\theta_c}(\dot{x}_n, \Delta x_n, \Delta x_{n-1}, \ldots, \Delta \dot{x}_n, \Delta \dot{x}_{n-1}, \ldots) \qquad (1),$$

where $\ddot{x}_n$ is vehicular acceleration, $f_{\theta_c}$ is a model function, $\dot{x}_n$ is vehicle speed, $\Delta x_n$ is a distance measured from the vehicle operated by the driver to a next vehicle, current vehicle, or currently detected vehicle (e.g., a vehicle beside or in front of the vehicle on a road, lane, parking stall, etc.), $\Delta x_{n-1}$ is a distance measured from the vehicle operated by the driver to a previous vehicle (e.g., a vehicle that was "passed" or is now behind the vehicle), $\Delta \dot{x}_n$ is the relative speed of the vehicle relative to a previous vehicle, is also the relative speed of the vehicle relative to an additional, previous vehicle, and $\theta_c$ is a vector of the behavioral parameters (e.g., lane change aggressiveness, politeness factor, maximum speed, maximum acceleration, comfortable deceleration, reaction time, safe time headway, etc.) associated with the driver in a given context c. A predefined discrete set of contexts (e.g., wet, dry, heavy traffic, etc.) may also be used for the physical behavior models 504. The behavior parameters may depend on the context of the journey (e.g., road type, weather conditions, road signs, traffic density, time of day, etc.). In a given context, the behavioral parameters may define the conditions of the driver and the risk (e.g., a short reaction time is safe, a high lane change aggressiveness is unsafe, a higher than usual reaction time denotes a fatigue condition, a higher than usual lane change aggressiveness denotes stress).

In order to the learn the behavior parameters of an operator of a vehicle, relative sensor data, vehicle probe data (e.g., speed and acceleration), and contextual data may be used. The learned behavior parameters may be stored and used to determine a risk associated with the one or more learned behavior parameters, as in block 506. A risk assessor operation 508 may compare the learned behavior parameters of block 506 with one or more historically learned behavior parameters using a collective behavioral parameter database 510 and also with a driver's own previously learned behavioral parameters stored in a vehicle operator ("personal") behavior parameter database 512. That is, a risk assessment operation may compare learned behavior parameters to individual or collective distributions of behavior parameters for the context of the journey. Accordingly, a risk may be assessed or determined according to the comparison. A warning, a mitigation action, feedback action, or a combination thereof may be issued or provided, as in block 514.

It should be noted that one or more various types of physical behavior models may be employed. For example, for longitudinal dynamics, a car-following model may be employed (e.g., an Intelligent Driver model, an optimal velocity model). These models may define the acceleration of a vehicle as a nonlinear function of speed, relative distance and speed to the leading vehicle, and behavioral parameters. For lateral dynamics, lane-changing models, (e.g., the gap acceptance models, minimizing overall braking induced by lane changes "MOBIL" model, etc.) may define a decision-making process of lane changing based on the relative distance and speed to vehicles in targeted lanes and behavioral parameters.

Figure 6:
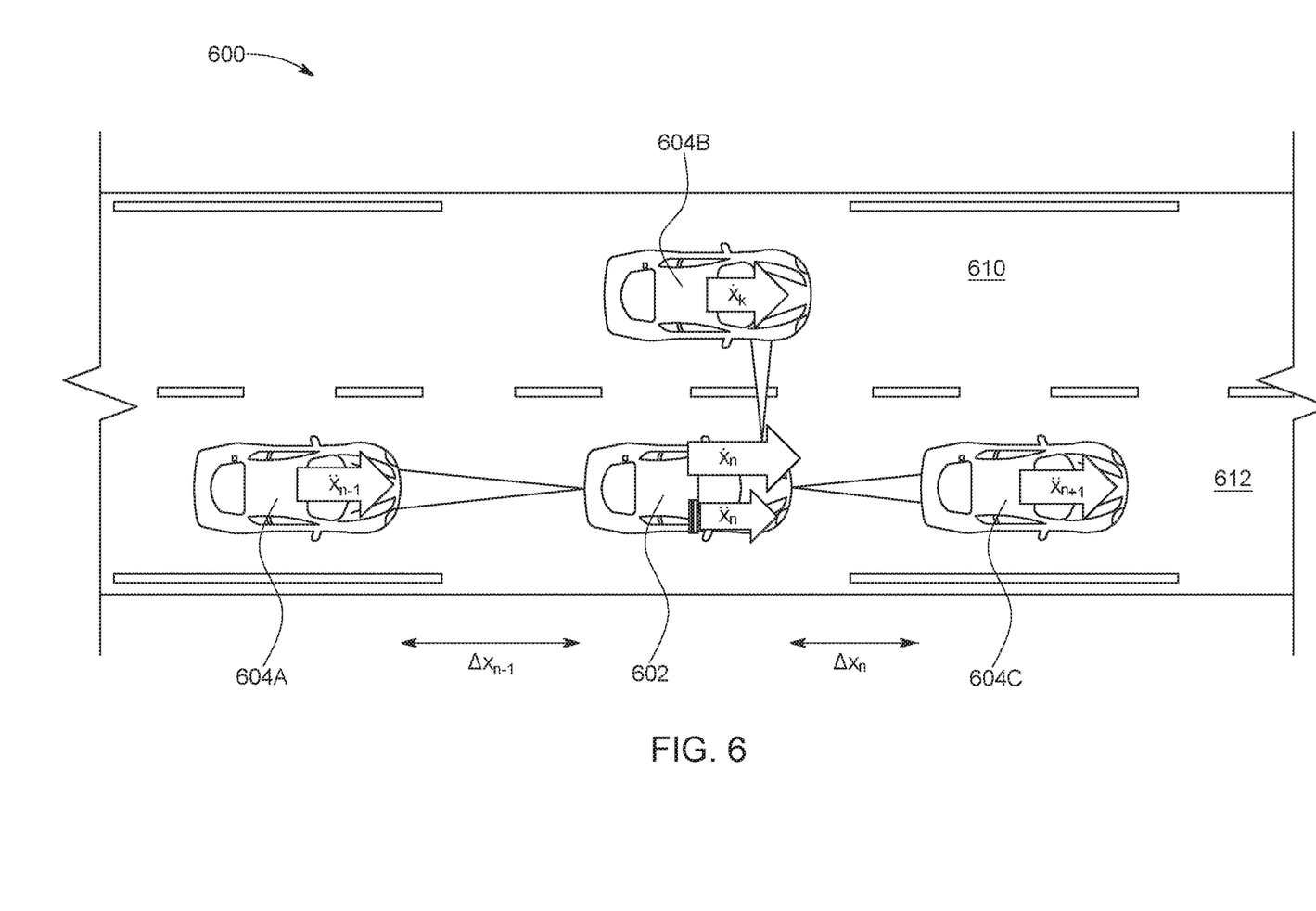
FIG. 6 is a diagram depicting learning longitudinal and lateral behavior parameters of an operator of a vehicle based on vehicle speed, relative positioning of the vehicle, and relative speed to surrounding vehicles in accordance with aspects of the present invention.

Turning now to FIG. 6, diagram 600 is depicted for learning longitudinal and lateral behavior parameters of an operator of a vehicle based on vehicle speed, relative positioning of the vehicle, and relative speed to surrounding vehicles. As illustrated, vehicle 602 is being operated by an operator and traveling in a first lane 612 of a road. Vehicle 604A is behind vehicle 602 and traveling in the first lane 612. Vehicle 604B is to the side of vehicle 602 and traveling in a second lane 610 of a road. Vehicle 604C is ahead of vehicle 602 and traveling in the first lane 612.

Sensor data from one or more sensors of vehicle 602 relating to vehicle dynamics and relative vehicle dynamics may be used to learn the longitudinal and lateral behavior parameters of the operator of vehicle 602. In a given context of a journey, the behavioral parameters may define the conditions of the driver of vehicle 602. The context of the journey can be learned via additional internal or external data sources (e.g., to infer the road type, the weather conditions, the traffic density, etc.). In an additional aspect, vehicular collaboration data may be received from vehicles 604A-C via "vehicle-to-vehicle" ('V2V') communication and/or other car-external data sources may be considered (e.g. drones, moving cameras, or non-vehicular systems). For example, the vehicular collaboration data may include, for example, receiving one or more images, audio data, video stream, sensor based device data, or a combination thereof from each imaging or sensing device associated with the vehicle 602 and vehicles 604A-C.

Using the captured sensor data and/or data from one or more IoT devices, a series of driver behavior parameters of vehicle 602 may be learned based on physical behavioral models and indicators (e.g., lane changing, car-following, safety indicators), such as used in equation 1 of FIG. 5. In an additional aspect, one or more alternative physical behavior models may also be used in addition to equation 1 such as, for example, equation 2:

$$\ddot{x}_n(t+\tau)=\alpha \times [\dot{x}_{n+1}(t)-\dot{x}_n(t)] \qquad (2),$$

where $\theta$ (of equation 1) is equal to [t, $\alpha$], t is the reaction time, and a is the aggressiveness of behavior of the driver. In short, access to sensor data relating to position, speed, acceleration, deceleration, and contextual factors relating to vehicle 602 and other vehicles such as, for example, vehicles 604A-C enables the assessment of a risk associated with the one or more learned behavior parameters.

As illustrated, the vehicular acceleration ($\ddot{x}_n$) and vehicle speed ($\dot{x}_n$) may be determined for vehicle 602. Moreover, the vehicular acceleration ($\dot{x}_{n-1}$) of the vehicle 604A may also be determined in relation to vehicle 602. The vehicular acceleration ($\dot{x}_{n+1}$) of the vehicle 604C may also be determined in relation to vehicle 602. The vehicular acceleration ($\dot{x}_k$) of the vehicle 604B may also be determined in relation to vehicle 602.

The distance ($\Delta x_n$) from the vehicle 602 to a next vehicle, current vehicle, or currently detected vehicle such as, for example, vehicle 604B may also be determined. The distance ($\Delta x_{n-1}$) from the vehicle 602 to a previous vehicle such as, for example, 604A may also be determined. Thus, the captured sensor data and/or contextual data enables the learning of the driver's behavior parameters of vehicle 602 based on physical behavioral models and indicators (e.g., reaction time, maximum acceleration, deceleration parameters, induced deceleration parameter, lane changing, car-following, safety indicators, aggressive behavior or driving behavior, and the like).

Figure 7:
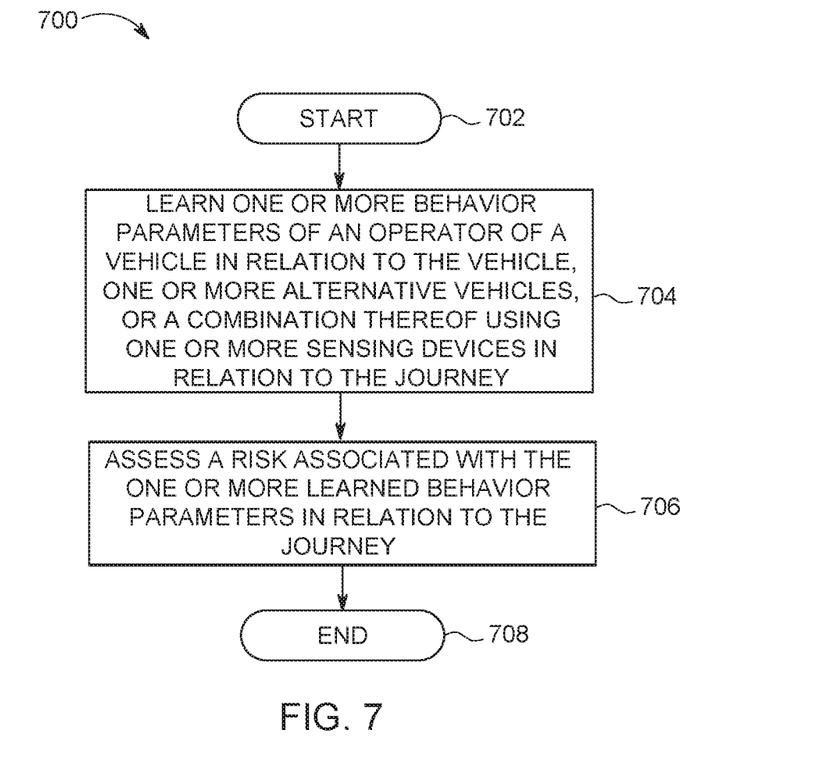
FIG. 7 is a flowchart diagram of an additional exemplary method for real-time monitoring risk associated with operating a vehicle in relation to a journey using sensing by a processor, in which various aspects of the present invention may be realized.

Turning now to FIG. 7, a method 700 for monitoring risk associated with operating a vehicle in relation to a journey using one or more sensing devices by a processor is depicted, in which various aspects of the illustrated embodiments may be implemented. The functionality 700 may start in block 702. One or more learned behavior parameters of an operator of a vehicle may be learned in relation to the vehicle, one or more alternative vehicles, or a combination thereof using one or more sensing devices in relation to a journey, as in block 704. A risk associated with the one or more learned behavior parameters may be assessed, as in block 706. The functionality 700 may end, as in block 708.

In one aspect, in conjunction with and/or as part of at least one block of FIG. 7, the operations of 700 may include each of the following. The operations of 700 may learn longitudinal and lateral behavioral parameters using the one or more sensing devices associated with the vehicle. The operations of 700 may determine the speed and acceleration/deceleration of the vehicle and/or determine the relative position and speed of the vehicle to surrounding vehicles using the one or more sensing devices associated with the vehicle in the context of the journey. In other words, the operations of 700 may 1) determine, in real time, an acceleration, speed, and/or a position of the vehicle using the one or more sensing devices associated with the vehicle, 2) determine, in real time, speed and/or acceleration of the one or more alternative vehicles and the position of the one or more alternative vehicles in relation to the vehicle using the one or more sensing devices associated with the vehicle, wherein the one or more alternative vehicles are either in front of the vehicle, behind the vehicle, or adjacent to the vehicle, 3) track speed and acceleration using the one or more sensing devices associated with the vehicle, and/or 4) track speed and/or acceleration of the one or more alternative vehicles and a position of the one or more alternative vehicles in relation to the vehicle using the one or more sensing devices.

The context of the journey may be determined and/or inferred using the one or more learned behavior parameters. That is, the tracking of the speed, acceleration, and/or position of the vehicle and/or the speed, acceleration, and/or the relative position of the vehicle to surrounding vehicles (e.g., in front of the vehicle, behind the vehicle, to the right and/or left of the vehicle) may be used to infer one or more behavioral parameters of a user (e.g., driver).

The operations of 700 may also learn one or more contextual factors relating to the journey using the one or more sensing devices associated with the vehicle, wherein the one or more contextual factors include traffic data, weather data, road conditions, road types, a health state of the operator, biometric data of the operator, position data of one or more alternative vehicles in relation to the vehicle, or a combination thereof. The driving behavior of the operator of the vehicle may be monitored and tracked using the one or more learned behavior parameters.

The operations of 700 may provide or suggest one or more mitigating actions or alerts to reduce the risk. For example, the mitigating actions may include a communication (e.g., visual or audio communication) that may indicate to the user to take an action to mitigate or "reduce" the risk (e.g., adjust your speed in relation to the vehicle in front of you to reduce a detected driving risk). The mitigating actions may include engaging a self-parking and/or self-driving ("autopilot") system, issuing a command to take a defined course of action in response to the risk, or provide an audible or visual alert.

The operations of 700 may detect an anomaly in driving behavior of the operator based on a real-time comparison operation between the one or more learned behavior parameters and a previously learned behavior parameter of the operator, one or more alternative drivers of the one or more alternative vehicles, or a combination thereof. That is, the real-time comparison operation may be performed by comparing the real-time learned one or more behavior parameters and a distribution of previously learned behavior parameters, the distribution being either personal learned behavior parameters or collective learned behavior parameters among a set of drivers. An anomaly or deviation for standardized behavior or defined behavior for a particular route may be detected in the driving behavior of the operator based on a comparison between the one or more learned behavior parameters and previously learned distribution of behavior parameters.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowcharts and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowcharts and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowcharts and/or block diagram block or blocks.

The flowcharts and block diagrams in the Figures illustrate the architecture, functionality, and operation of possible implementations of systems, methods, and computer program products according to various embodiments of the present invention. In this regard, each block in the flowcharts or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustrations, and combinations of blocks in the block diagrams and/or flowchart illustrations, can be implemented by special purpose hardware-based systems that perform the specified functions or acts or carry out combinations of special purpose hardware and computer instructions.

The invention claimed is:

1. A method, by a processor, for monitoring risk associated with operating a vehicle, comprising:
    receiving, from one or more sensing devices, data corresponding to an operation of a vehicle in relation to one or more alternative vehicles in proximity to the vehicle;
    training a machine learning model to identify one or more learned behavior patterns of an operator of the vehicle using the data and additional data from external data sources;
    learning, by the trained machine learning model, the one or more learned behavior parameters of the operator of the vehicle in relation to the vehicle and the one or more alternative vehicles using the one or more sensing devices for a journey; and
    assessing a risk associated with the one or more learned behavior parameters according to the trained machine learning model.

2. The method of claim 1, further including determining an acceleration, speed, position, or a combination thereof of the vehicle using the one or more sensing devices associated with the vehicle.

3. The method of claim 2, further including determining and tracking speed, acceleration, or a combination thereof of the one or more alternative vehicles and a position of the one or more alternative vehicles in relation to the vehicle using the one or more sensing devices associated with the vehicle, wherein the one or more alternative vehicles are in front of the vehicle, behind the vehicle, adjacent to the vehicle, or a combination thereof.

4. The method of claim 1, further including monitoring driving behavior of the operator using the one or more learned behavior parameters.

5. The method of claim 1, wherein learning the one or more learned behavior parameters further includes learning one or more contextual factors relating to the journey using the one or more sensing devices associated with the vehicle, wherein the one or more contextual factors include traffic data, weather data, road conditions, road types, or a combination thereof.

6. The method of claim 1, further including detecting an anomaly in driving behavior of the operator based on a real-time comparison operation between the one or more learned behavior parameters and a previously learned behavior parameter of the operator, a plurality of vehicle operators, or a combination thereof.

7. The method of claim 1, further including providing one or more mitigating actions or alerts to reduce the risk, wherein the one or more sensing devices include one or more positioning sensors, one or more Internet of Things (IoT) devices, or a combination thereof.

8. A system for monitoring risk associated with operating a vehicle, comprising:
    one or more computers with executable instructions that when executed cause the system to:
        receive, from one or more sensing devices, data corresponding to an operation of a vehicle in relation to one or more alternative vehicles in proximity to the vehicle;
        train a machine learning model to identify one or more learned behavior patterns of an operator of the vehicle using the data and additional data from external data sources;
        learn, by the trained machine learning model, the one or more learned behavior parameters of the operator of the vehicle in relation to the vehicle and the one or more alternative vehicles using the one or more sensing devices for a journey; and
        assess a risk associated with the one or more learned behavior parameters according to the trained machine learning model.

9. The system of claim 8, wherein the executable instructions further determine and track an acceleration, speed, position, or a combination thereof of the vehicle using the one or more sensing devices associated with the vehicle.

10. The system of claim 9, wherein the executable instructions further determine and track speed, acceleration, or a combination thereof of the one or more alternative vehicles and a position of the one or more alternative vehicles in relation to the vehicle using the one or more sensing devices associated with the vehicle, wherein the one or more alternative vehicles are in front of the vehicle, behind the vehicle, adjacent to the vehicle, or a combination thereof.

11. The system of claim 8, wherein the executable instructions further monitor driving behavior of the operator using the one or more learned behavior parameters.

12. The system of claim 8, wherein learning the one or more learned behavior parameters further includes learning one or more contextual factors relating to the journey using the one or more sensing devices associated with the vehicle, wherein the one or more contextual factors include traffic data, weather data, road conditions, road types, or a combination thereof.

13. The system of claim 8, wherein the executable instructions further detect an anomaly in driving behavior of the operator based on a real-time comparison operation between the one or more learned behavior parameters and a previously learned behavior parameter of the operator, one or more alternative drivers of the one or more alternative vehicles, or a combination thereof.

14. The system of claim 8, wherein the executable instructions further provide one or more mitigating actions or alerts to reduce the risk, wherein the one or more sensing devices include one or more positioning sensors, one or more Internet of Things (IoT) devices, or a combination thereof.

15. A computer program product for monitoring risk associated with operating a vehicle by a processor, the computer program product comprising a non-transitory computer-readable storage medium having computer-readable program code portions stored therein, the computer-readable program code portions comprising:
    an executable portion that receives, from one or more sensing devices, data corresponding to an operation of a vehicle in relation to one or more alternative vehicles in proximity to the vehicle;
    an executable portion that trains a machine learning model to identify one or more learned behavior patterns of an operator of the vehicle using the data and additional data from external data sources;
    an executable portion that learns, by the trained machine learning model, the one or more learned behavior parameters of the operator of the vehicle in relation to the vehicle and the one or more alternative vehicles using the one or more sensing devices for a journey; and
    an executable portion that assesses a risk associated with the one or more learned behavior parameters according to the trained machine learning model.

16. The computer program product of claim 15, further including an executable portion that:
    determines and tracks an acceleration, speed, position, or a combination thereof of the vehicle using the one or more sensing devices associated with the vehicle; and
    determines and tracks speed, acceleration, or a combination thereof of the one or more alternative vehicles and a position of the one or more alternative vehicles in relation to the vehicle using the one or more sensing devices associated with the vehicle, wherein the one or more alternative vehicles are in front of the vehicle, behind the vehicle, adjacent to the vehicle, or a combination thereof.

17. The computer program product of claim 15, further including an executable portion that monitors driving behavior of the operator using the one or more learned behavior parameters.

18. The computer program product of claim 15, wherein learning the one or more learned behavior parameters further includes learning one or more contextual factors relating to the journey using the one or more sensing devices associated with the vehicle, wherein the one or more contextual factors include traffic data, weather data, road conditions, road types, or a combination thereof.

19. The computer program product of claim 15, further including an executable portion that detects an anomaly in driving behavior of the operator based on a real-time comparison operation between the one or more learned behavior parameters and a previously learned behavior parameter of the operator, a plurality of vehicle operators, or a combination thereof.

20. The computer program product of claim 15, further including an executable portion that provides one or more mitigating actions or alerts to reduce the risk, wherein the one or more sensing devices include one or more positioning sensors, one or more Internet of Things (IoT) devices, or a combination thereof.

* * * * *